US011992093B2

United States Patent
Yang et al.

(10) Patent No.: US 11,992,093 B2
(45) Date of Patent: May 28, 2024

(54) POWER GENERATING AND GAIT ASSISTING FOOTWEAR ARTICLE

(71) Applicant: City University of Hong Kong, Hong Kong (CN)

(72) Inventors: Zhengbao Yang, Hong Kong (CN); Qiqi Pan, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 300 days.

(21) Appl. No.: 17/648,197

(22) Filed: Jan. 18, 2022

(65) Prior Publication Data

US 2023/0225448 A1 Jul. 20, 2023

(51) Int. Cl.
*A43B 7/32* (2006.01)
*H02N 2/18* (2006.01)

(52) U.S. Cl.
CPC ............... *A43B 7/32* (2013.01); *H02N 2/186* (2013.01)

(58) Field of Classification Search
CPC .. A43B 7/03; A43B 3/00; A43B 21/45; A43B 21/433
USPC ............................................................. 36/7.8
See application file for complete search history.

(56) References Cited

U.S. PATENT DOCUMENTS

| | | | | |
|---|---|---|---|---|
| 6,281,594 | B1 * | 8/2001 | Sarich | H02P 9/04 290/1 R |
| 8,013,463 | B2 * | 9/2011 | Preston | F03G 7/00 290/1 R |
| 9,498,017 | B2 * | 11/2016 | Lin | A43B 3/38 |
| 10,071,201 | B2 * | 9/2018 | Su | A61B 5/14532 |
| 2015/0088057 | A1 * | 3/2015 | Su | A61F 7/007 604/66 |

* cited by examiner

*Primary Examiner* — Timothy K Trieu
(74) *Attorney, Agent, or Firm* — S&F/WEHRW (57) ABSTRACT

The present invention provides a device for improving energy economy and wearing comfort of a power generating, gait assisting footwear article while maintaining normal gait pattern during human locomotion. The device includes a motion conversion mechanism to convert linear reciprocating moment exerted on the device during heel strike/up into a series of rotations; a rotation acceleration module to increase the speed of rotations before being transformed into electric current by a generator. The device also includes a power management module and energy storage element(s) for energy storage and power supply to the footwear article or external electronics.

15 Claims, 6 Drawing Sheets

POWER GENERATING AND GAIT ASSISTING FOOTWEAR ARTICLE

TECHNICAL FIELD

The present invention relates to an integrated device for footwear article to generate power while having gait assisting function.

BACKGROUND

In a fast-changing and evolving manner of human lifestyle, incorporation of multi-functions into a footwear has become a trend, especially incorporating elements involving energy economy, which has drawn many attentions from users, footwear developers/manufacturers, and researchers in the relevant field. Some of them have proposed various paradigms to reduce energy expenditure such as spring-based structures or soft and elastic materials which have become a mainstream of conventional human augmented-locomotion assistant devices with energy harvesting protocols on harnessing biochemical energy during walking.

For harvesting biochemical energy during walking, some major energy conversion mechanisms include utilizing electromagnetic, triboelectric and/or piezoelectric effect(s) of human locomotion during walking. For example, U.S. Pat. No. 8,970,054 provided an electromagnetic energy harvester with a displacement-amplified mechanism to harvest and also increase the power generated by an electric generator configured to be driven by a downward movement of a heel plate during a heel strike phase of walking.

U.S. Pat. No. 8,716,877 provided a generator module having at least an elastic generator affixed to the leg shank of a wearer to harvest the energy generated from ankle joint motion. This device is limited by the ankle joint motion of the wearer in terms of change in angular motion of the ankle joint. From a different perspective, the generator affixed to the wearer limits the ankle motion and/or affects the comfort of the wearer.

U.S. Pat. No. 9,057,361 provided a biomechanical energy harvester for harnessing energy from the motion of one or more joints with an electromagnetic effect. Several sensors were coupled in that harvester to serve as a clutch for determining the mutualistic and non-mutualistic conditions.

For the biomechanical energy harvesters using piezoelectric effect, different configurations have been employed in the existing devices for capturing energy generated from different motions. For example, Shenck et al. (2001) used a flexible piezoelectric foil stave to harness sole-bending energy while a reinforced PZT dimorph was used to capture heel-strike energy.

Fan et al. (2017) provided a shoe-mounted piezoelectric energy harvester having a rotor combined with a bimorph PZT cantilever beam, and permanent magnets being attached at the free ends of the beam to harness the kinetic energy associated with foot strike motions, where the bimorphs were excited by movements of a steel ball coupled to the beam along its sleeve during the foot strike motions.

US 2006/0021261 provided a piezoelectric energy harvester within a cavity of a sole member which captures the power generated from the deformation of a curved bimorph during a touchdown moment.

In addition, a number of studies on different energy conversation elements applied in footwear or exoskeleton show that these elements can reduce energy or metabolic cost by about 4% to 8% (Hoogkamer et al., 2017; Simpson et al., 2019; Collins et al., 2015).

Gait assisting is another element that many people would like to have in their footwear. With such a surging market demand, a lot of wearable exoskeletons or exosuits have been recently developed with both energy harvesting and gait assisting functions, which can be generally divided into passive (for example, in US 2013/0281895, U.S. Pat. Nos. 8,053,914 and 7,956,476) and active (for example, in U.S. Pat. Nos. 10,326,312, 9,918,515 and 11,044,968) mechanisms.

In terms of reducing muscle force, U.S. Pat. No. 9,282,783 provided gait assisting shoes that can utilize parallel function of the Achilles' tendons through an integration of force-carrying mechanisms to manage forces and energies associated with dorsiflexion and plantar flexion; a sandal-like sole made of a resilient, elastic, springy material was provided in U.S. Pat. No. 7,290,358, which aids in the natural walking action by alternately compressing and releasing, adding energy to the step, thereby aiding walking while wearing ski boots; a similar design was employed in a walking support of a boot in US 2011/0302808, where soft materials were used to enhance wearer's comfort.

However, none of those prior arts has a simple, integrated design to couple various profiles including shock absorbing, energy harvesting and gait assisting into a single device. Moreover, none of them could generate sufficient power for high energy demand electronics, but only generated power of less than one Watt since most of them are limited by the size, weight and/or structure of the device. Some of them require attachment or affixation to certain part of one or both limbs that may limit the motion of the corresponding joint(s) and affect normal gait pattern.

Therefore, there is a need for an integrated device including all the afore-mentioned features/functions while the disadvantages and problems described above in the prior arts could be at least diminished or substantially eliminated.

SUMMARY OF INVENTION

Accordingly, provided herein is a simple, lightweight, and integrated walking assistive device for improving energy economy, shock absorption, wearing comfort of an article of footwear while maintaining normal gait pattern during human locomotion.

In a first aspect, the prevent invention provides a device including:

a motion conversion module including an impact force absorbing and resilient member; and one or more guided members being attached to the impact force absorbing resilient member;

a rotation acceleration module comprising a plurality of rotatable members and communicating with the motion conversion module;

an electrical energy generator communicating with the rotation acceleration module; and a frame accommodating the motion conversion module, rotation acceleration module and electrical energy generator, wherein the motion conversion module is vertically extended from a horizontal section of the frame forming a sleeve, the sleeve is internally threaded;

at least one of the guided members is configured to move along the internally threaded sleeve when the impact force absorbing resilient member moves vertically along the sleeve due to a heel strike or up motion of the wearer's foot;

the one or more guided members, upon moving along the internally threaded sleeve, drive(s) at least one of the rotatable members of the rotation acceleration module to rotate, thereby subsequently driving the remaining rotatable members of the rotation acceleration module;

the electrical energy generator transforms rotational energy of the rotatable members of the rotation acceleration module into electric energy to be stored in an energy storage element and/or supplied to other parts of the article of the footwear and external electronics.

In one embodiment, the impact force absorbing and resilient member is a spring with one end attached to a top end of the sleeve and an opposite end attached to a first guided member.

In one embodiment, the first guided member attached to the spring is disc-like. It includes a plurality of teeth disposed at a periphery thereof such that the first guided member is capable to move along the internally threaded sleeve.

In an exemplary embodiment, the first guided member is engaged with a second guided member such that when the first guided member moves along the internally threaded sleeve, the second guided member is driven to rotate either clockwise or counterclockwise.

In one embodiment, the second guided member is rod-like with one end attached to the first guided member and an opposite end attached to a first rotatable member of the rotation acceleration module such that when the second guided member rotates due to vertical displacement of the first guided member along the internally threaded sleeve, the first rotatable member is driven to rotate.

In the first aspect, the one or more rotatable members of the rotation acceleration module is/are preferably gears having the same or different size and/or number of teeth with each other, and is/are driven by rotation of the first rotatable member.

In one embodiment, more than one of the gears are arranged in hierarchy to minimize the size of the rotation acceleration module in the frame. At least two of the gears in different size and number of teeth form a pair of gears to interact with another pair of gears such that an initial rotational speed by the rotation of the first rotatable member is increased through the interactions among different pairs of gears in the rotation acceleration module.

The electrical energy generator of the present device can be selected from an electromagnetic generator and is activated by the rotation of the gear that is disposed most proximally to the electrical energy generator.

In one embodiment, the electromagnetic generator is connected to a power management module including one or more rectifiers to convert alternating current generated by the electromagnetic generator into direct current.

The power management module further includes voltage converter to regulate the direct current level to be output to the energy storage element, other parts of the article of footwear, and/or external electronics.

The rotational speed of the most proximal gear to the electrical energy generator is adjustable by adjusting one or both of a helical pitch and a twist angle of the internal threads of the sleeve in the motion conversion module, and/or adjusting a frequency up-conversion ratio between each of the gears of the same pair in the rotation acceleration module.

A second aspect of the present invention provides a power generating and gait assisting article of footwear including the device of the first aspect or any embodiments thereof described hereinafter, a power management circuit; and one or more energy storage elements.

In an exemplary embodiment, the footwear article of the second aspect includes a first hollow space at a heel section of the article for disposing the present device and a second hollow space in the middle of an insole of the article for disposing the power management circuit and the one or more energy storage elements.

The footwear article is selected from boots, shoes, or high-heeled footwear.

A third aspect of the present invention provides a method for improving energy harvesting and shock absorbing efficiencies of an article of footwear including:

providing a first hollow space at a heel section and a second hollow space in the middle of an insole of the article of footwear;

incorporating the device of the first aspect or described hereinafter into the first hollow space; and incorporating a power management circuit and one or more energy storage elements into the second hollow space.

There is also provided in the present invention a power generating and gait assisting article of footwear fabricated according to the method of the third aspect or described hereinafter.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

Skilled artisans will appreciate that elements/features shown in the figures are illustrated for simplicity and clarity and have not necessarily been depicted to scale.

DETAILED DESCRIPTION OF THE INVENTION

It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The present invention applies a unique two-stage frequency-up conversion mechanism to the integrated, walking assistive device for naturally harnessing collisional energy during the touch-down moment of an associated article of footwear during human walking in order to enhance the energy economy and gait pattern thereof together with improvement in wearing comfort.

Figure 1:
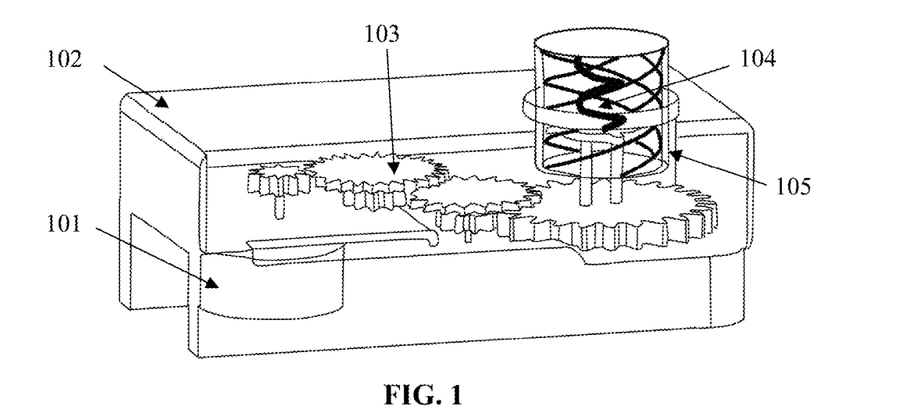
FIG. 1 shows an isometric view of the present device according to an embodiment of the present invention.

Turning into FIG. 1, the major components of the present device according to an exemplary embodiment are shown from an isometric view, including a generator 101, a frame 102, a gearbox 103, a spring 104, and a sleeve 105. It should be understood that auxiliary components, detail and/or variations of the major components, and/or connections between different components of the present device may be omitted from FIG. 1 for simplicity of illustration.

In FIG. 1, the present device as shown is embedded into a heel section of shoes, for example, within or adjacent to a cushion pad of an article of footwear. The sleeve 105 is connected to the cushion pad of the footwear article. The generator 101 is embedded into a base of the frame 102 to save a vertical space therein for accommodating other major components, in particular, the gearbox 103 which is attached on to a base of the frame 102. The gearbox 103 includes a plurality of gears in connection with one or more guided members forming communication between the sleeve 105, the gearbox 103, and the generator 101.

In this example, the gearbox 103 is secured on the base of the frame 102 with an adhesive. However, it is possible to secure the gearbox 103 on the base of the frame 102 with other available means/methods. To balance between wearing comfort and power output performance, a working displacement of the sleeve 105 in vertical direction is set to be about 3.5 cm in this example.

To minimize frictional loss and wear arising from an engagement between the internal threads of the sleeve 105 and a guided disc with teeth (not shown in FIG. 1) driven by gears of the gearbox 103, lubricant such as grease may be applied to a space between the internal threads and the guided disc so that when the guided disc rotates around the internally threaded surface of the sleeve, the teeth of the guided disc are allowed to move more smoothly.

In certain embodiments, the frame 102 and the sleeve 105 can be made of flexible, elastic, and lightweight materials such as resins and be fabricated by 3D printing to improve the flexibility, elasticity, and wearing comfort of the footwear article incorporated with the present device. The present device is embedded into a cavity of the heel section of the footwear article so not to cause any uncomfortableness to the wearer. The frame 102 is also configured to limit the horizontal movement of the outer profile of the sleeve 105. Due to the materials used to fabricate the components and the number of the components to form the present device, the weight and volume thereof can be significantly reduced. In one embodiment, the weight of the present device can be reduced to about 100 g or lower. In another embodiment, the volume of the present device can be reduced to about 118 $cm^3$ or lower.

Figure 2:
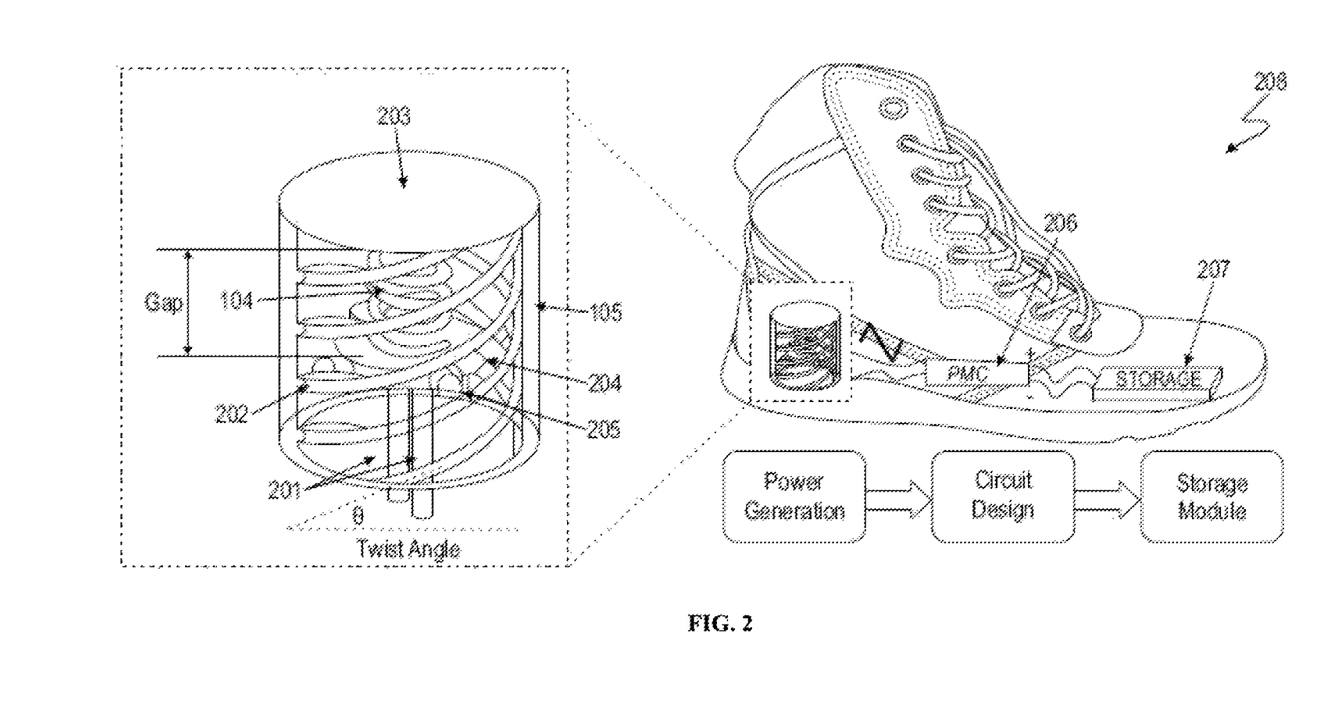
FIG. 2 schematically depicts the working principle of the present device and how it imparts shock absorbing, gait assisting and energy harvesting properties to an article of footwear.

Turning into FIG. 2, the schematic diagram on the left panel depicts how collisional energy is harvested by the present device in an article of footwear, for example, in a boot (on the right panel). As shown on the left panel of FIG. 2 is a close-up isometric view of the sleeve 105 accommodating the spring 104 of the present device, where two parallel guided rods 201 are provided in the sleeve 105 to connect the gearbox 103 (not shown in FIG. 2) and a guided disc 204. One end of the spring 104 is attached on to a surface of the guided disc 204 while an opposite end of the spring 104 is attached to a lower surface of the sleeve top 203. The sleeve 105 including an upper surface of the sleeve top 203 is embedded inside an insole of the footwear article to enhance the wearing comfort. The guided disc 204 includes a plurality of teeth 205 at the periphery thereof so that the guided disc 204 is capable to rotate along the internal threads 202 of the sleeve 105, thereby converting a linear reciprocating motion into rotation of the guided disc 204 along the internal threads 202 in accordance with a designated pitch and twist angle (θ) of the sleeve 105 during a heel strike/heel up moment which triggers a vertical or substantially vertical movement of the spring 104. This configuration limits the movement direction and range of the motion conversion mechanism without sacrificing normal gait pattern such as step length, width and frequency, etc.

Figure 5:
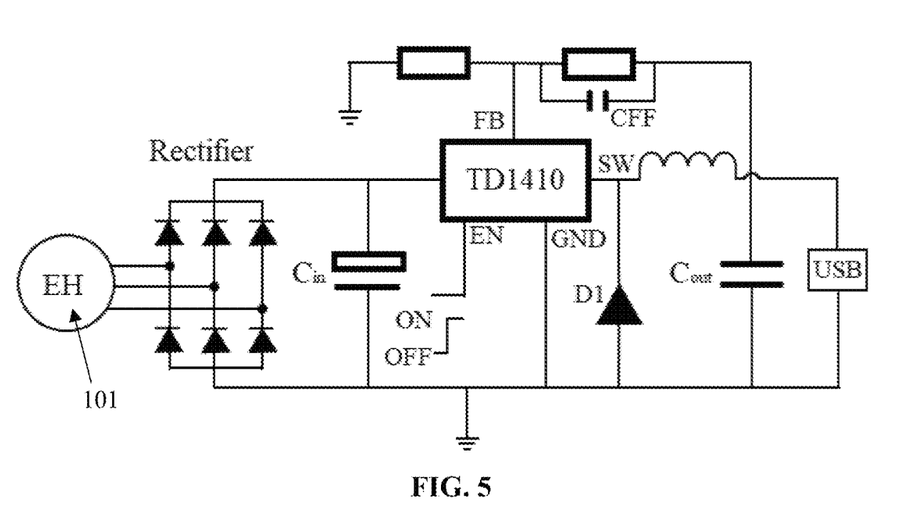
FIG. 5 shows a circuitry diagram of power management of the present device according to an embodiment of the present invention.

Provided on the right panel of FIG. 2 is an exemplary embodiment of a footwear article, for example, a boot, incorporated with the present device and illustration of how the linear reciprocating motion is transformed into electric current and then stored in the footwear article. In that exemplary embodiment, a power management circuit (PMC) 206 is provided in the middle of the sole of the boot 208 for receiving power (in a form of alternating current) generated by the generator 101 and convert thereof into electricity that can be ultimately stored into one or more energy storage modules 207 which is disposed under an arch section of the boot 208. The PMC 206 mainly includes AC-DC converter, impedance matching circuit, and capacitors, and signal indicators, which are collectively for converting an alternating current received from the generator 101 into direct current at a proper voltage level which can be stored by the storage module(s) and/or be used directly to supply power to other parts of the footwear article and/or other electronics. Detailed circuitry diagram of an exemplary embodiment of the PMC is depicted in FIG. 5 and descriptions hereinafter.

Figure 3:
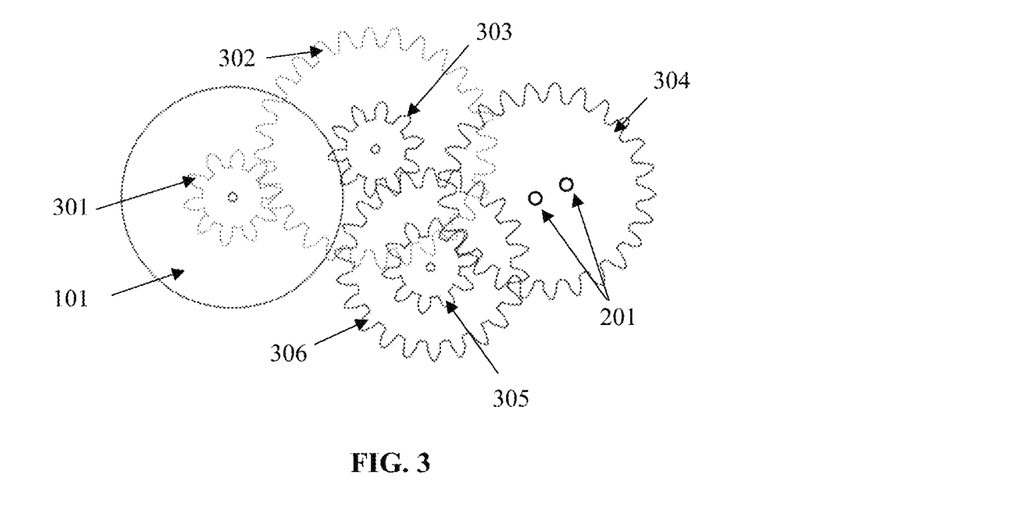
FIG. 3 schematically depicts communications between a generator, a gearbox and a spring of the present device according to certain embodiments of the present invention.

Turning into FIG. 3, the gearbox 103 and corresponding connections with the generator 101 and the motion conversion mechanism in the sleeve 105 are depicted. The rotation of the guided disc 204 along the internally threaded sleeve 104 due to the linear reciprocating moment exerted on the sleeve top 203 as illustrated in FIG. 2 drives guided rods 201 to rotate, with one end fixed to the guided disc 204 and an opposite end fixed to a gear plate 304. Two parallel rods' design will be more stable to transmit strong torque compared with a single one. The gear plate 304 turns the rest of the gears (301, 302, 303, 305, 306). In order to reduce the size of the gearbox 103, the gears in this example are arranged in hierarchy and in pairs, that is, gears 301 and 302 form a pair; gears 303 and 306 form another pair; gears 304 and 305 form a third pair. When gear 304 turns, it drives its corresponding gear 305 which is concentrically connected to a gear of a second hierarchical pair, gear 306, such that gear 306 will also be driven, accordingly, thereby driving a corresponding gear 303 to turn, etc. Thus, the heel strike force exerted on the sleeve 105 is transformed into rotation through the motion conversion mechanism within the sleeve 105, and the rotational speed of the guided member of the motion conversion mechanism is increased along this hierarchy of gears in the gearbox 103 until gear 301 which is connected to the generator 101. This hierarchical arrangement of gears in the gearbox 103 can ensure a substantially full transformation of the heel strike force exerted on the sleeve top 203 by the wearer during walking into a high-speed rotation of the generator 101, in order to result in a high power output while the normal gait pattern and wearing comfort are not sacrificed. Power output of the present device can be adjusted by adjusting the frequency up-conversion ratio among different pairs of gears. Relationship between the power output of the present device and frequency up-conversion ratio of different gears will be further elaborated hereinafter.

Figure 4:
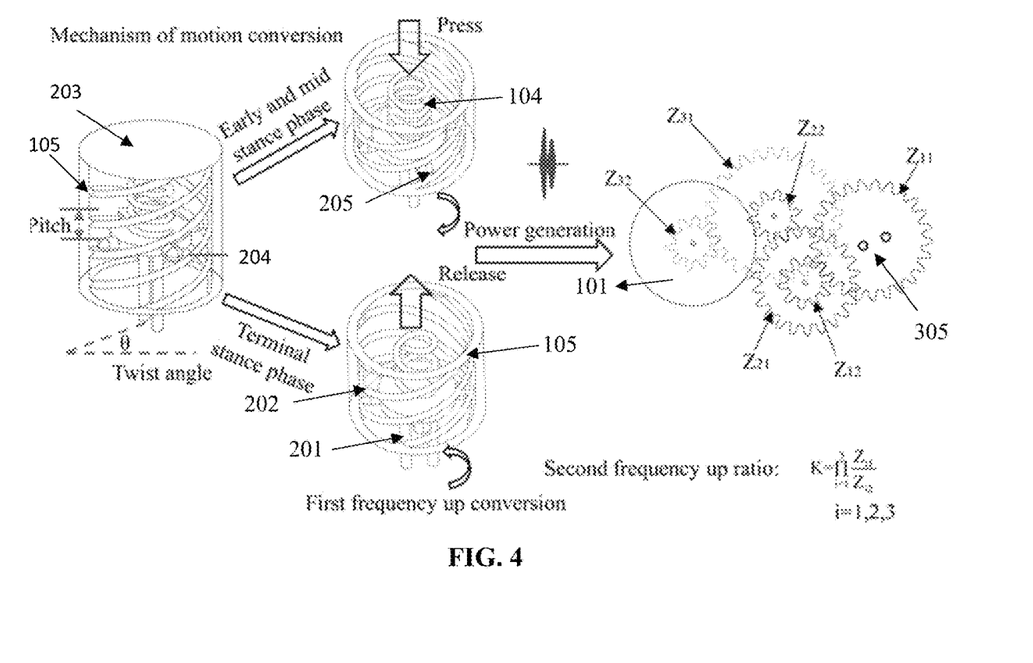
FIG. 4 schematically depicts power generation by the present device over a gait cycle when being applied to an article of footwear according to an embodiment of the present invention.

Turning into FIG. 4, how the linear motion of heel strike is converted into energy and how the level of power output can be adjusted in the present device are schematically depicted. Taking one gait cycle as an example, the spring 104 during the early and mid stance phase is compressed by the heel strike force exerted on the sleeve top 203 to force the attached guided disc 204 in the presence of a number of teeth 205 at its periphery to move downwards along the internal threaded line 202. In this example, the guided disc 204 with the teeth 205 rotates clockwise along the internal threaded line 202. The rotation of guided disc 204 drives the attached guided rods 201 and the gear 305 attached thereto to rotate in the same circular direction. Once the gear 305 is driven to rotate, the corresponding gear 304 of the same pair and other lower hierarchical pairs of gears in the gearbox 103 will be driven to rotate in order to eventually drive the generator 101. The spring 104 disposed in the sleeve 105 also serves to absorb at least partially the impact force of the touchdown moment to protect the heel against excessive load.

During the terminal stance phase, the compressed spring 104 is released while a restoring force is provided for the heel up moment, thus assisting contraction of soleus and gastrocnemius muscles. Meanwhile, the restoring force also drives the guided members (guided disc and rods) to rotate counterclockwise in order to eventually drive the generator 101 for power generation when the sleeve top returns to its initial position. Therefore, the heel strike energy is fully captured by the vertical and circular movements of the corresponding mechanical parts of the motion-energy conversation mechanism within the sleeve of the present invention during stance phase of each gait cycle while the heel section is protected against excessive load by the spring.

The speed of rotation of the guided members within the sleeve to exert the first frequency up conversion can be adjusted by adjusting the magnitude of the pitch of the internal thread line and/or the twist angle. The smaller the magnitude of each pitch is, or the larger the twist angle is, the higher is the speed of rotation of the guided members within the sleeve.

During each gait cycle, the speed of the initial rotation of the most proximal gear to the guided rods, gear 305, is increased by the gears of the gearbox 103 before the generator 101 is driven. The afore-mentioned hierarchical arrangement of gears enables a second frequency up conversion. In FIG. 4, moduli and the number of teeth of each pair of gears ($Z_{11}$, $Z_{12}$; $Z_{21}$, $Z_{22}$; $Z_{31}$, $Z_{32}$) can be adjusted to optimize the final speed of rotation of the most proximal gear, gear 301, to the generator 101. The frequency up conversion ratio (K) for each pair of gears of the gearbox 103 is represented by the following equation:

$$K = \prod_{i=1}^{3} \frac{Z_{i1}}{Z_{i2}}$$

In this example, i=1, 2, or 3.

It should be understood that the number of gears of the gearbox, hierarchical arrangement thereof, and/or the frequency up conversion ratio is/are adjustable in order to optimize the rotational speed of the most proximal gear with respect to the generator 101.

Turning into FIG. 5, the generator 101 includes or is connected to one or more rectifiers for converting AC into DC current. The generator 101 can be one or more electromagnetic generators being rectifier circuits for AC-DC conversion. The generator 101 can be connected to a power management circuit (PMC), such as the PMC shown in FIG. 2, where it includes, but not limited to, rectifiers, voltage converter, and capacitors, and signal indicators. For example, TD1410 module shown in FIG. 5 is used to manage the DC output at a proper voltage level for the following energy storage element. The PMC can further include or be connected to an energy storage element such as supercapacitors and rechargeable batteries. The energy stored in such an energy storage element can be used to supply power to other electronics of the same footwear article or to other portable electronics including, but not limited to, smartphones, sensors, display/screen, and wireless communication modules. Since most of the circuits in the PMC do not occupy a lot of space (except some sensors/indicators), and therefore they can all be installed in the heel section of the footwear article, or simply within the frame of the present device. In a preferred embodiment, the PMC is incorporated into the frame of the present device to reduce the overall size of the device, and by which it can save cost on extra installation.

Figure 6A:
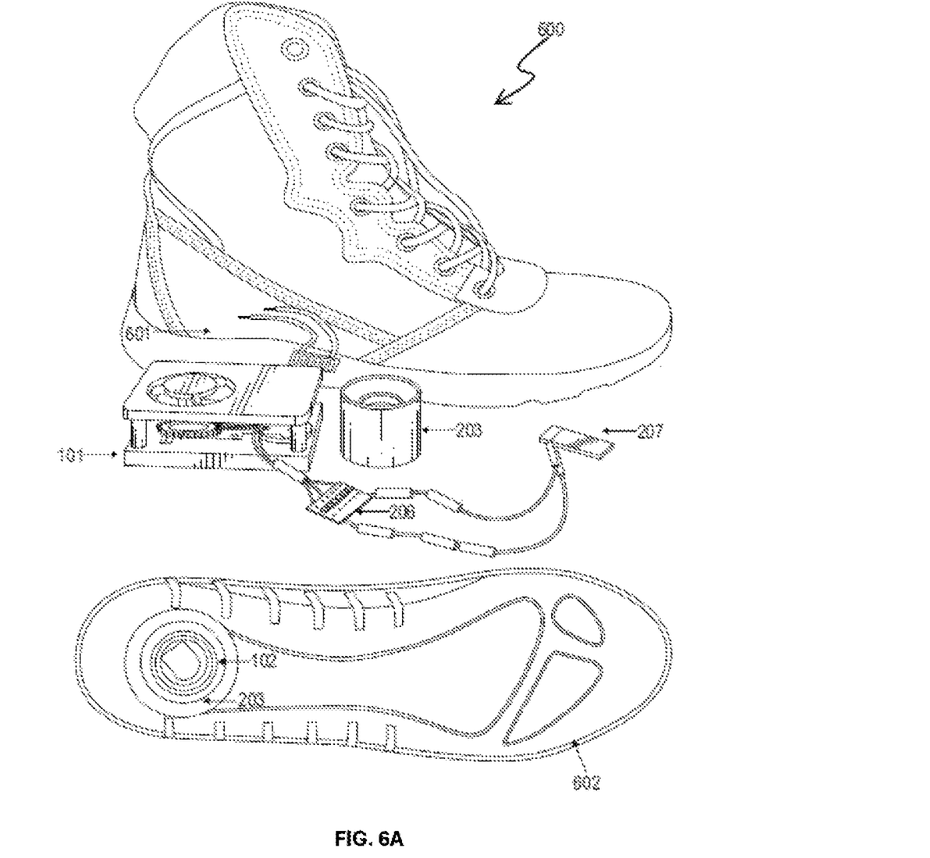
FIG. 6A shows images of an article of footwear with the present device according to an embodiment of the present invention.

Turning into FIG. 6A, it shows a footwear article, which is a boot 600, with hollow heel section 601 and hollow insole 602. For simplicity of illustration, the sleeve 105 and frame 102 of the present device are separated from the generator 101 in FIG. 6A. The power management circuit (PMC) 206 and energy storage element 207 are electrically connected to the generator 101 in this example. In an exemplary embodiment, the frame 102 and sleeve 105 are made of flexible, elastic, and lightweight materials, such as acrylonitrile-butadiene-styrene (ABS), to reduce the overall weight and enhance the wearing comfort, and the materials selected are preferably 3D printable. All the major components (101, 102, 103, 104, 105) of the present device are embedded into the hollow heel section 601 while the PMC 206 and energy storage element 207 are embedded into the hollow insole 602 of the boot 600. From a bottom view of the boot 600, part of the frame 102 and the sleeve 203 can be visualized, while the PMC 206 and energy storage element 207 are fully embedded into the insole 602 so that they cannot be visualized from this view.

Figure 6B:
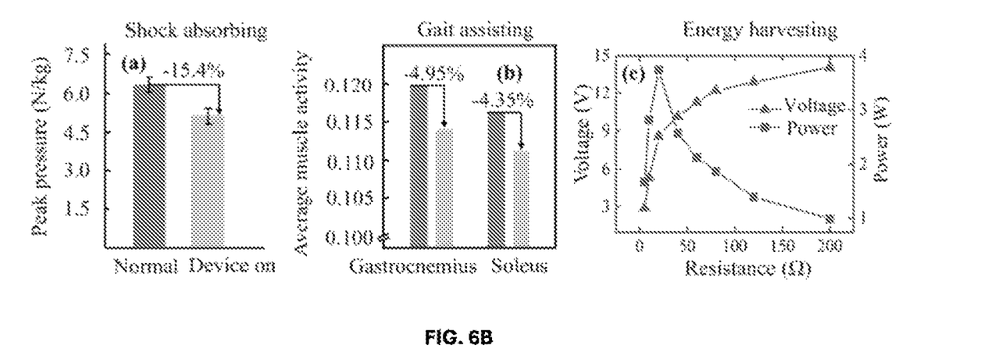
FIG. 6B shows test results of different performances of the present device according to the embodiment as shown in FIG. 6A.

FIG. 6B shows different performance test results of the boot 600 incorporated with the present device. Shock absorbing performance of the boot 600 is verified by about 15.4% reduction in peak pressure between a normal (inactive) state and active state of the present device. Gait assisting performance is verified by measuring the change in average muscle activity of two main calf muscles, gastrocnemius and soleus muscles, with or without the activation of the present device. The results (bar chart in the middle of the lower panel) suggest that the present device reduces the muscle activity of gastrocnemius and soleus muscles by about 4.95% and about 4.35%, respectively, compared to those measured under inactive state of the device. In terms of the energy harvesting performance, under excitation by stride frequency of about 1.1 Hz, the present device is capable to generate a maximum voltage of about 13 V and a peak power of 3.8 Watts, provided that the pitch is 10 mm with a 45-degree twist angle, and the up conversion ratio of the gear box is 65. The dimension of the frame 102 of the device in this example is 55 mm (L)×35 mm (W)×25 mm (H), or in an total volume of about 118 cm$^3$ (including the volume of the frame 102 and the sleeve 105), and a total mass of about 101 grams. A subsequent measurement (results are not shown in FIG. 6B) on power output from a pair of the boots 600 both incorporated with the same configuration of the present device shows that the boots can generate over 7 Watts of peak power collectively.

Although the invention has been described in terms of certain embodiments, other embodiments apparent to those of ordinary skill in the art are also within the scope of this invention. Accordingly, the scope of the invention is intended to be defined only by the claims which follow.

INDUSTRIAL APPLICABILITY

The structure of present invention is simple, and can be easily assembled, thus the manufacturing cost could be minimized. The present invention is also easy to be scaled up, thus is suitable for large-scale industrialization. The reasonable size and weight of the present device makes it easy to fit into substantially all types of footwear. Adjustable voltage output by varying different parameters of the mechanical parts of the present device also provides flexibility and simplicity for meeting different requirements and performance expectations of footwear articles.

What is claimed is:

1. A device for improving energy harvesting, gait assisting and shock absorbing efficiencies while maintaining normal gait pattern of a wearer of an article of footwear during locomotion, the device comprising:
  a motion conversion module comprising an impact force absorbing and resilient member; and one or more guided members being attached to the impact force absorbing and resilient member;
  a rotation acceleration module comprising a plurality of rotatable members and communicating with the motion conversion module;
  a generator communicating with the rotation acceleration module; and
  a frame accommodating the motion conversion module, the rotation acceleration module and the generator,
  the motion conversion module being vertically extended from a horizontal section of the frame forming a sleeve, wherein the sleeve is internally threaded,
  at least one of the guided members being configured to move along the internally threaded sleeve when the impact force absorbing and resilient member moves vertically along the sleeve due to a heel strike or up motion of the wearer's foot,
  the one or more guided members, upon moving along the internally threaded sleeve, driving at least one of a plurality of rotatable members of the rotation acceleration module to rotate, thereby subsequently driving the remaining rotatable members of the rotation acceleration module;
  the generator transforming rotational energy of the rotatable members of the rotation acceleration module into electric energy to be stored in an energy storage element and/or supplied to other parts of the article of the footwear and external electronics,
  wherein the impact force absorbing and resilient member is a spring with one end attached to a top end of the sleeve and an opposite end attached to a first guided member,
  wherein the first guided member attached to the spring is disc-like and comprises a plurality of teeth disposed at a periphery thereof such that the first guided member is capable to move along the internally threaded sleeve.

2. The device of claim 1, wherein the first guided member is engaged with a second guided member such that when the first guided member moves along the internally threaded sleeve, the second guided member is driven to rotate either clockwise or counterclockwise.

3. The device of claim 2, wherein the second guided member is rod-like with one end attached to the first guided member and an opposite end attached to a first rotatable member of the rotation acceleration module such that when the second guided member rotates due to vertical displacement of the first guided member along the internally threaded sleeve, the first rotatable member is driven to rotate.

4. The device of claim 3, wherein one or more rotatable members of the rotation acceleration module is/are gears having the same or different size and/or number of teeth with each other, and is/are driven by rotation of the first rotatable member.

5. The device of claim 4, wherein more than one of the gears are arranged in hierarchy and at least two of the gears in different size and number of teeth form a pair of gears to interact with another pair of gears such that an initial rotational speed by the rotation of the first rotatable member is increased through the interactions among different pairs of gears in the rotation acceleration module.

6. The device of claim 5, wherein the generator is an electromagnetic generator and is activated by the rotation of the gear that is disposed most proximally to the electromagnetic generator.

7. The device of claim 6, wherein the electromagnetic generator is connected to a power management module comprising one or more rectifiers to convert alternating current generated by the electromagnetic generator into direct current.

8. The device of claim 6, wherein the rotational speed of the most proximal gear to the electromagnetic generator is adjustable by adjusting one or both of a helical pitch and a twist angle of the internal threads of the sleeve in the motion conversion module, and/or adjusting a frequency up-conversion ratio between each of the gears of the same pair in the rotation acceleration module.

9. The device of claim 7, wherein the power management module further comprises voltage converter to regulate the direct current level to be output to the energy storage element, other parts of the article of footwear, and/or external electronics.

10. The device of claim 1, wherein within a space between the teeth of the first guided member and a path of the internal threads of the sleeve along which the first guided member moves within the sleeve is added with a lubricant to smoothen the path that the teeth of the first guided member travel.

11. A shock absorbing, power generating and gait assisting article of footwear comprising:
  the device of claim 1;
  a power management circuit; and one or more energy storage elements to provide electricity for portable electronics.

12. The article of claim 11, further comprises a first hollow space at a heel section of the article for disposing the device and a second hollow space in the middle of an insole of the article for disposing the power management circuit and the one or more energy storage elements.

13. The article of claim 11 being selected from boots, shoes, or high-heeled footwear.

14. A method for improving energy harvesting and shock absorbing efficiencies of an article of footwear comprising:
   providing a first hollow space at a heel section and a second hollow space in the middle of an insole of the article of footwear;
   incorporating the device of claim 1 into the first hollow space; and
   incorporating a power management circuit and one or more energy storage elements into the second hollow space.

15. A shock absorbing, power generating and gait assisting article of footwear fabricated according to the method of claim 14.

* * * * *